(12) United States Patent
Böhler et al.

(10) Patent No.: US 6,561,037 B2
(45) Date of Patent: May 13, 2003

(54) OVERLOAD-PROOF PRESSURE SENSOR

(75) Inventors: Ewald Böhler, Wolfach (DE); Jörn Jakob, Wolfach (DE); Manfred Liehr, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 09/887,548

(22) Filed: Jun. 25, 2001

(65) Prior Publication Data
US 2002/0014122 A1 Feb. 7, 2002

(30) Foreign Application Priority Data
Jun. 30, 2000 (DE) .......................................... 100 31 129

(51) Int. Cl.⁷ ................................................ G01L 7/08
(52) U.S. Cl. .......................................... 73/715; 73/706
(58) Field of Search .................. 73/700–756; 361/283.4

(56) References Cited

U.S. PATENT DOCUMENTS 5,528,452 A * 6/1996 Ko ............................... 73/718
5,750,899 A * 5/1998 Hegner et al. ................. 73/756

FOREIGN PATENT DOCUMENTS

| DE | 88 15 425 | 5/1990 |
| DE | 39 12 217 | 10/1990 |
| DE | 41 11 119 | 10/1992 |
| DE | 42 07 952 | 4/1993 |
| DE | 196 08 321 | 8/1997 |
| DE | 297 11 759 | 9/1998 |
| EP | 0 339 981 | 11/1989 |
| EP | 0 373 536 | 6/1990 |

* cited by examiner

*Primary Examiner*—Hezron Williams
*Assistant Examiner*—Andre Allen
(74) *Attorney, Agent, or Firm*—Nath & Associates PLLC; Gary M. Nath; Marvin C. Berkowitz

(57) ABSTRACT

The invention pertains to a pressure sensor for a pressure measuring transducer which contains a base body (3), and a pressure-sensitive measuring membrane (7). The membrane is located on the base body (3) and can be subjected to a measurable pressure. The first chamber (10) is arranged between the base body (3) and the measuring membrane (7) in order to protect the measuring membrane (7) if the pressure to be measured exceeds an upper pressure limit. A second chamber (11) is provided to protect the measuring membrane (7) if the pressure to be measured falls short of a lower pressure limit. The second chamber (11) is arranged between the measuring membrane (7) and a contact plate (5) The contact plate is situated on the side of the measuring membrane (7) opposite the base body (3). A bore (6) is provided for subjecting the measuring membrane (7) to pressure.

15 Claims, 2 Drawing Sheets

OVERLOAD-PROOF PRESSURE SENSOR

FIELD OF THE INVENTION

The invention pertains to an overload-proof pressure sensor of the type described in the preamble of claim 1.

DESCRIPTION OF THE RELATED ART

When measuring the pressure in pipelines or containers with installed valves, so-called pressure surges are caused when the valves are opened from the sudden inflow of the process fluid. The pressure peaks caused by these pressure surges are occasionally so intense that the measuring membrane of the pressure sensor may become damaged or destroyed by these surges. This means that the operability of the pressure sensor can no longer be ensured.

EP 373 536 B1 describes a pressure sensor arrangement with means for protecting the pressure sensor from overloads in the form of undesirable pressure surges. This pressure sensor contains a stepped chamber that supports the measuring membrane by means of a contact surface in case of an overload. If the pressure to be measured exceeds an upper pressure limit, it thus protects the measuring membrane from becoming damaged or destroyed.

However, the aforementioned pressure peaks not only occur when the valves are opened, but also when they are closed. The backflow of the process fluid causes undesirable negative pressure surges. The pressure peaks caused by negative pressure surges may be equally as intense [as the excessive surges]. The membrane may become damaged or even destroyed in case of such an underload.

A pressure sensor with overload and underload protection means has not been disclosed so far.

SUMMARY OF THE INVENTION

Consequently, the objective of the present invention is to make available a pressure sensor of the initially described type which is also highly underload-proof.

According to the invention, this objective is attained with a pressure sensor that is realized in accordance with the characteristics of claim 1.

The invention proposes a pressure sensor of the initially described type which is characterized by the fact that it provides a second chamber in order to protect the measuring membrane if the pressure to be measured falls short of a lower pressure limit. The second chamber is arranged between the measuring membrane and a contact plate. The contact plate is situated on the side of the measuring membrane which lies opposite the base body. A bore is provided for subjecting the measuring membrane to pressure.

This pressure sensor has an optimal resistance to pressure. It has a resistance to an excess pressure in case of an overload, as well as a resistance to a negative pressure in case of an underload.

One particularly advantageous refinement of the invention is achieved if at least one of the chambers contains an annular step. The annular contact surfaces of the respective steps formed in this way provide an optimal support effect in case of an overload or an underload, so that the measuring membrane can be additionally protected from destruction or damage. It is particularly advantageous if the chambers are outfitted with several steps.

It is preferred that the base body and the contact plate are connected to the measuring membrane by means of annular diffusion-tight connections. A solder glass connection is preferably utilized as the diffusion-tight connection. Naturally, this connection can also be done with any other connecting material that has an acceptable diffusion-preventing effect similar to glass or quartz glass. Acceptable connections may be a hard-soldered welded or bonded. However, the solder glass rings provide the advantages of being electrically insulating, and thermally stable even at high temperatures. The rings also prevent any diffusion of gases or hydrogen from the outside toward the inside.

In one preferred embodiment of the invention, the base body and/or the measuring membrane and/or the contact plate are manufactured from a ceramic material, e.g., $Al_2O_3$-ceramics, SiC-ceramics, glass ceramics, quartz or $ZrO_2$-ceramics. However, the base body can also be manufactured from an iron-nickel alloy because it has a coefficient of thermal expansion similar to the above-mentioned ceramics. It is also particularly advantageous that the measuring membrane consists of a preferably metallic corrosion-proof material, such as special steel. When using different materials for the measuring membrane and the base body, the materials need to have a largely similar coefficient of thermal expansion to ensure that the fewest possible mechanical distortions occur during temperature fluctuations. It is particularly preferred to manufacture the base body, measuring membrane and the contact plate entirely from ceramics.

The pressure exchange medium typically consists of an oil, such as hydraulic or silicone oil. However, it would be possible to use any other fluid or even a gas.

The pressure sensor is in the advantageous form of a capacitive pressure sensor. The measuring membrane either forms the layer electrode or a circular or annular layer electrode is applied onto the measuring membrane. The layer electrode of the measuring capacitor is arranged in the chamber between the measuring membrane and the base body. A vacuum or a conventional gas with a corresponding disruptive strength is typically used as the dielectric.

Other advantageous embodiments and refinements of the invention are disclosed in the subclaims, the description and the figures.

BRIEF DESCRIPTION OF THE FIGURES

The invention is described in greater detail below with reference to the embodiments illustrated in the figures. The figures show:

Identical elements and elements that function identically are identified by the same reference symbols in both figures.

FIG. 1 shows a partial section through a first general embodiment of the pressure sensor according to the invention. In FIG. 1, the reference symbol 1 identifies the pressure sensor of a pressure measuring transducer. The pressure sensor 1 contains a block-shaped, preferably cylindrical base body 3. Electrical connection pins 4 extend from the base body 3 out of the pressure sensor 1. A contact plate 5 is arranged on the opposite side of the base body 3, and it is coupled to a pressure-averaging unit, not illustrated in FIG. 1, by means of a bore 6. It is advantageous—however, not absolutely imperative—to arrange the bore 6 centrally in the contact plate 5. A pressure-sensitive measuring membrane 7 is arranged between the base body 3 and the contact plate 5. The measuring membrane 7 is connected to the base body 3 on one side and to the contact plate 5 on the other side by means of annular connections 8, 9 that are diffusion-tight toward the outside.

Figure 1:
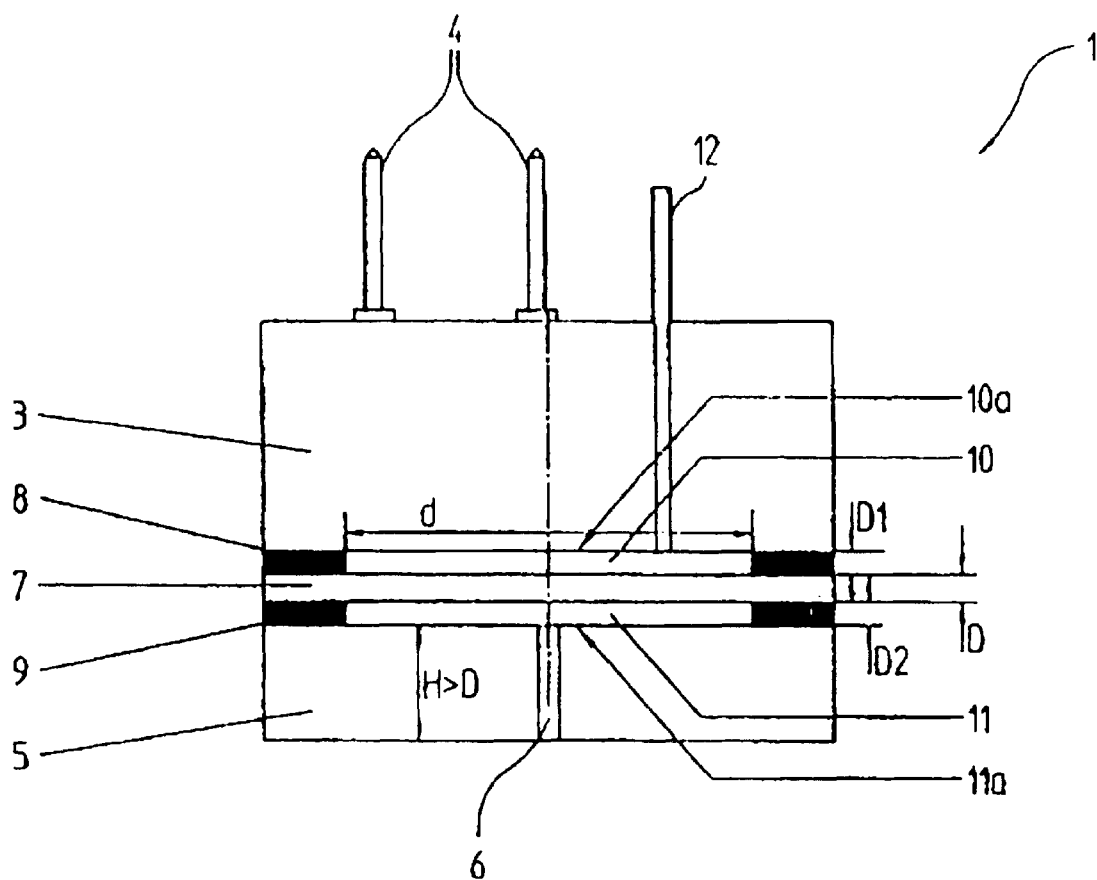
FIG. 1, the first embodiment of the pressure sensor according to the invention, and FIG. 2, a second embodiment of the pressure sensor according to the invention.

A first chamber 10 typically evacuated or filled with a gas is formed between the measuring membrane 7 and the base body 3. A second chamber 11 is connected to the bore 6, and it is formed between the measuring membrane 7 and the contact plate 5. The bore 6 and the second chamber 11 contain a pressure exchange medium. This medium is typically a silicone or hydraulic oil, and it is used to subject the measuring membrane 7 to a measurable pressure.

DETAILED DESCRIPTION

The pressure sensor 1 is designed in such a way that the pressure to be measured causes a deformation of the measuring membrane 7. The deformation is measured and converted into an electric signal as a function of the deformation. The electric signal can be obtained from the pressure sensor 1 via the electric connecting pins 4. An additional bore 12 that is connected to the first chamber 10 makes it possible to evacuate the first chamber 10 or to fill the chamber 10 with a medium that is resistant to flashovers. As an alternative, the first chamber 10 may be subjected to the atmospheric pressure through the additional bore 12.

The measuring membrane 7 and the base body 3 form a gap-shaped or slot-shaped chamber 10 that spaces the base body 3 apart from the measuring membrane 7 by a distance D1. Analogously, the second slot-shaped chamber 11 spaces the measuring membrane 7 apart from the contact plate 5 by a distance D2. In this case, the first chamber 10 serves as an overload protection. If the pressure exceeds an upper pressure limit, the measuring membrane 7 adjoins the opposing face 10a of the base body 3 and is protected from becoming destroyed or damaged. The second chamber 11 serves as an underload protection. If the second chamber 11 is subjected to a negative pressure or suction through the bore 6, the measuring membrane 7 adjoins the opposing face 11a of the contact plate 5 such that the measuring membrane 7 is protected from becoming destroyed or damaged if the pressure falls short of a lower pressure limit. The resistance of the pressure sensor 10 to overloads and underloads can be definitively adjusted for an excess pressure, and a negative pressure, by adjusting the distances D1, D2. The dimensions of these distances D1, D2 essentially depend on the following characteristics of the measuring membrane 7: material thickness D of the measuring membrane 7, its active diameter d and the desired upper and lower pressure limits.

Figure 2:
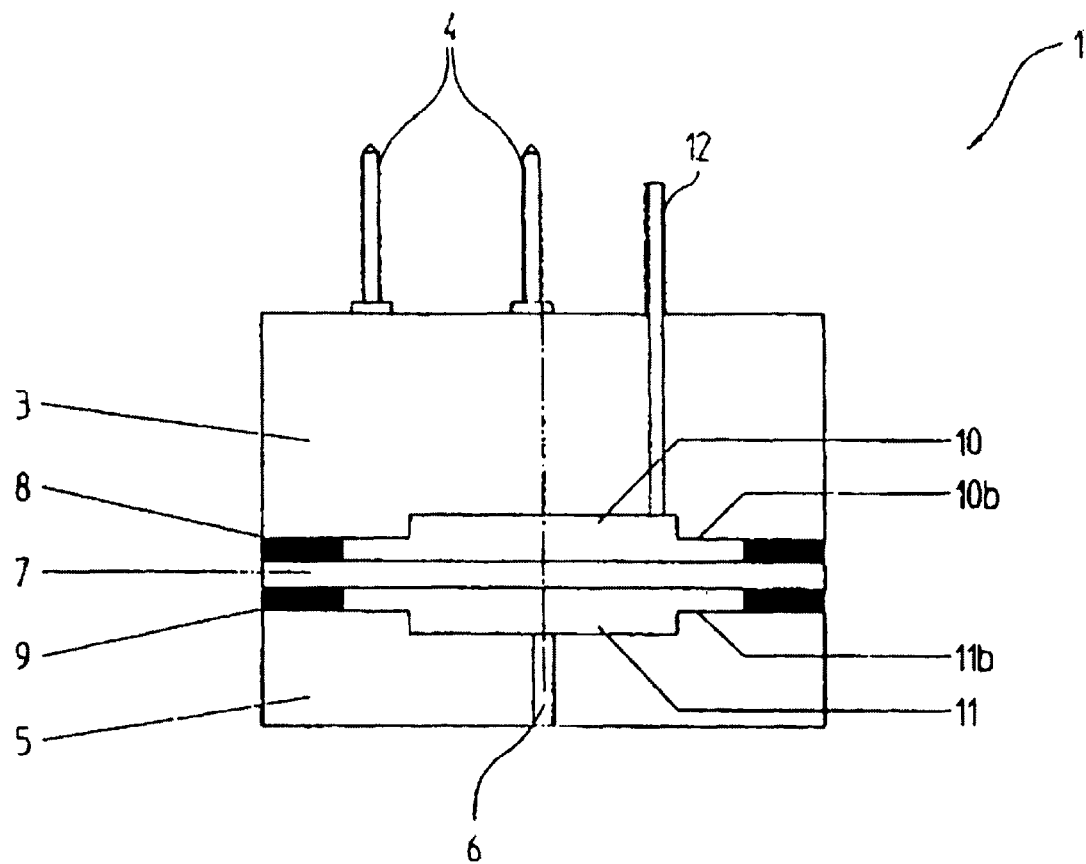

FIG. 2 shows a second, refined embodiment of the pressure sensor 1 according to the invention. The pressure sensor 1 is refined in such a way that the first chamber 10 and the second chamber 11 are arranged in a stepped fashion. When an excess pressure occurs, the measuring membrane 7 initially adjoins the opposing annular surface 10b of the first step. The central regions of the membrane 7 can be additionally expanded if an excess pressure occurs. The second chamber 11 is analogously arranged in a stepped fashion in case an underload occurs. When an underload occurs, the measuring membrane 7 initially adjoins the opposing annular surface 11b of the first step. The annular contact surfaces formed by surfaces 10b, and 11b provide an optimal support effect if an excess pressure or a negative pressure of the pressure exchange medium occurs. This means that the measuring membrane 7 is additionally protected from becoming destroyed or damaged. The pressure sensors' resistance to an overload or an underload can be increased if the measuring membrane 7 is adjoined by several stepped annular contact surfaces and is supported in its center.

The thickness D of the measuring membrane depends on the material of the measuring membrane 7 used. When using a measuring membrane 7 of special steel, the measuring membrane 7 typically has a thickness D between 0.1 mm and 2.0 mm. The height H of contact plate 5 should be much greater than the thickness D of the measuring membrane 7 for stability reasons.

List of reference symbols
1 Pressure sensor
3 Base body
4 Electric connecting pins
5 Contact plate
6 Bore
7 Measuring membrane
8 Diffusion-tight connection
9 Diffusion-tight connection
10 First chamber
10a Face of the first chamber
10b Annular contact surface of the first chamber
11 Second chamber
11a Face of the second chamber
11b Annular contact surface of the second chamber
12 Additional bore
D Thickness of the measuring membrane
D1 Width of the first chamber
D2 Width of the second chamber
H Height of the second base body part
d Diameter of the measuring membrane within the region of the first/second chamber

What is claimed is:

1. Overload-proof pressure sensor for a pressure measuring transducer that serves for measuring the pressure of liquid or gaseous media, comprising:
    a base body;
    a pressure-sensitive measuring membrane arranged on the base body for being subjected to a pressure to be measured;
    a first chamber arranged between the base body and the measuring membrane for protecting the measuring membrane if the pressure to be measured exceeds an upper pressure limit; and further comprising:
        a second chamber arranged between the measuring membrane and a contact plate situated on the side of the measuring membrane opposite the base body for protecting the measuring membrane if the pressure to be measured falls below a lower pressure limit; and
        a bore in communication with said second chamber for subjecting the measuring membrane to a pressure.

2. Pressure sensor according to claim 1, characterized by the fact that at least one of the first and second chambers contains at least one annular step.

3. Pressure sensor according to claim 1, characterized by the fact that the base body is connected to the measuring membrane by means of a first diffusion-tight connection and the contact plate is connected to the measuring membrane by means of a second diffusion-tight connection.

4. Pressure sensor according to claim 3, characterized by the fact that at least one of the first and second diffusion-tight connections is realized in the form of an annular solder glass connection.

5. Pressure sensor according to claim 1, characterized by the fact that one of the base body and the measuring membrane and the contact plate comprises at least partially of ceramic material.

6. Pressure sensor according to claim 5, characterized by the fact that the base body, the measuring membrane and the contact plate consist entirely of ceramic material.

7. Pressure sensor according to claim 1, characterized by the fact that one of the base body and the measuring membrane comprises at least partially of $Al_2O_3$-ceramics, SiC-ceramics, glass ceramics, quartz or $ZrO_2$-ceramics.

8. Pressure sensor according to claim 1, characterized by the fact that the measuring membrane comprises at least partially of a metallic material that is resistant to corrosion, preferably special steel.

9. Pressure sensor according to claim 1, characterized by the fact that an oil, in particular, a hydraulic or a silicone oil, is used for transmitting the pressure onto the measuring membrane.

10. Pressure sensor according to claim 1, characterized by the fact that the pressure sensor is realized in the form of a capacitive pressure sensor, wherein the measuring membrane forms one layer electrode of a measuring capacitor or a circular or annular layer electrode is arranged on the measuring membrane.

11. Pressure sensor according to claim 1, further comprising a second bore in communication with said first chamber.

12. Pressure sensor according to claim 1 wherein the range of the deformation distance of said measuring membrane subjected to a high pressure is limited by a face of said base body disposed towards said first chamber.

13. Pressure sensor according to claim 12 wherein the range of the deformation distance is adjustable.

14. Pressure sensor according to claim 1 wherein a range of a deformation distance of said measuring membrane subjected to a negative pressure is limited by a face of said contact plate disposed towards said second chamber.

15. Pressure sensor according to claim 14 wherein the range of the deformation distance is adjustable.

* * * * *

UNITED STATES PATENT AND TRADEMARK OFFICE
CERTIFICATE OF CORRECTION

PATENT NO.    : 6,561,037 B2
DATED         : May 13, 2003
INVENTOR(S)   : Böhler et al.

It is certified that error appears in the above-identified patent and that said Letters Patent is hereby corrected as shown below:

<u>Column 4,</u>
Line 39, change "for protecting" to -- that protects --.
Lines 44-45, change "for protecting" to -- that protects --.

<u>Column 6,</u>
Lines 4-5, change "the range of the" to -- a range of a --.

Signed and Sealed this

Second Day of September, 2003

JAMES E. ROGAN
*Director of the United States Patent and Trademark Office*